(12) United States Patent
Li et al.

(10) Patent No.: US 11,989,941 B2
(45) Date of Patent: May 21, 2024

(54) SYSTEMS AND METHODS FOR VIDEO AND LANGUAGE PRE-TRAINING

(71) Applicant: Salesforce, Inc., San Francisco, CA (US)

(72) Inventors: Dongxu Li, Canberra (AU); Junnan Li, Singapore (SG); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/566,173

(22) Filed: Dec. 30, 2021

(65) Prior Publication Data

US 2023/0154188 A1    May 18, 2023

Related U.S. Application Data

(60) Provisional application No. 63/279,986, filed on Nov. 16, 2021.

(51) Int. Cl.
| | |
|---|---|
| G06V 10/00 | (2022.01) |
| G06F 40/279 | (2020.01) |
| G06F 40/284 | (2020.01) |
| G06V 10/26 | (2022.01) |
| G06V 10/74 | (2022.01) |
| G06V 10/774 | (2022.01) |
| G06V 10/776 | (2022.01) |
| G06V 10/80 | (2022.01) |
| G06V 20/40 | (2022.01) |

(52) U.S. Cl.
CPC ............ *G06V 20/41* (2022.01); *G06F 40/279* (2020.01); *G06F 40/284* (2020.01); *G06V 10/26* (2022.01); *G06V 10/761* (2022.01); *G06V 10/774* (2022.01); *G06V 10/776* (2022.01); *G06V 10/806* (2022.01); *G06V 20/46* (2022.01); *G06V 20/47* (2022.01)

(58) Field of Classification Search
CPC ........ G06V 10/26; G06V 20/46; G06V 20/41; G06V 20/47; G06F 40/279; G06F 40/284
See application file for complete search history.

(56) References Cited

U.S. PATENT DOCUMENTS

| | | | |
|---|---|---|---|
| 10,332,508 B1 | 6/2019 | Hoffmeister et al. | |
| 2021/0026887 A1* | 1/2021 | Fukushima | G06F 16/7837 |
| 2022/0086401 A1* | 3/2022 | Hu | H04N 21/2187 |
| 2022/0327809 A1 | 10/2022 | Wei et al. | |

(Continued)

FOREIGN PATENT DOCUMENTS

WO    WO-2022261570 A1 * 12/2022

*Primary Examiner* — Molly Wilburn
*Assistant Examiner* — Ahmed A Nasher
(74) *Attorney, Agent, or Firm* — Haynes and Boone, LLP

(57) ABSTRACT

Embodiments described a method of video-text pre-learning to effectively learn cross-modal representations from sparse video frames and text. Specifically, an align and prompt framework provides a video and language pre-training framework that encodes the frames and text independently using a transformer-based video encoder and a text encoder. A multi-modal encoder is then employed to capture cross-modal interaction between a plurality of video frames and a plurality of texts. The pre-training includes a prompting entity modeling that enables the model to capture fine-grained region-entity alignment.

20 Claims, 11 Drawing Sheets

(56) References Cited

U.S. PATENT DOCUMENTS

| | | | |
|---|---|---|---|
| 2023/0104228 A1* | 4/2023 | Li | G10L 15/16 |
| | | | 704/232 |
| 2023/0147550 A1 | 5/2023 | Dongliang et al. | |
| 2023/0154159 A1* | 5/2023 | Kim | G06V 20/70 |
| | | | 382/159 |
| 2023/0282362 A1* | 9/2023 | Saillard | G06N 3/0464 |
| | | | 702/19 |

* cited by examiner

| Pre-training tasks | MSRVTT Retrieval | | | | DiDeMo Retrieval | | | | MSVD-QA | MSRVTT-QA |
| --- | --- | --- | --- | --- | --- | --- | --- | --- | --- | --- |
| | R1↑ | R5↑ | R10↑ | MdR↓ | R1↑ | R5↑ | R10↑ | MdR↓ | Acc.↑ | Acc.↑ |
| w/o pre-training | 16.5 | 42.8 | 57.9 | 7 | 9.5 | 29.1 | 42.5 | 14 | 41.5 | 39.6 |
| MLM + VTM | 28.5 | 53.0 | 66.8 | 5 | 29.8 | 57.7 | 69.7 | 4 | 43.3 | 40.9 |
| MLM + VTM + PEM | 30.3 | 56.7 | 67.8 | 4 | 31.0 | 61.8 | 73.5 | 3 | 46.3 | 41.8 |
| MLM + VTM + VTC | 32.8 | 59.2 | 70.3 | 3 | 36.8 | 64.7 | 77.4 | 2 | 45.5 | 41.9 |
| MLM + VTM + PEM + VTC | 33.9 | 60.7 | 73.2 | 3 | 35.9 | 67.5 | 78.8 | 3 | 45.9 | 42.1 |

| Method | PT datasets | R1↑ | R5↑ | R10↑ | MdR↓ |
|---|---|---|---|---|---|
| Finetuning | | | | | |
| JSFusion | - | 10.2 | 31.2 | 43.2 | 13 |
| HT100M | HT (100M) | 14.9 | 40.2 | 52.8 | 9 |
| ActBERT | HT (100M) | 16.3 | 42.8 | 56.9 | 10 |
| NoiseEst. | HT (100M) | 17.4 | 41.6 | 53.6 | 8 |
| HERO | HT (100M) | 16.8 | 43.4 | 57.7 | - |
| ClipBERT | COCO + VG (5.6M) | 22.0 | 46.8 | 59.9 | 6 |
| AVLNet | HT (100M) | 27.1 | 55.6 | 66.6 | 4 |
| VideoClip | HT (100M) | 30.9 | 55.4 | 66.8 | - |
| SupportSet | HT (100M) | 30.1 | 58.5 | 69.3 | 3 |
| FiT | Web2M + CC3M (5.5M) | 31.0 | 59.5 | 70.5 | 3 |
| ALPRO | Web2M + CC3M (5.5M) | 33.9 | 60.7 | 73.2 | 3 |
| Zero-shot | | | | | |
| HT100M | HT (100M) | 7.5 | 21.2 | 29.6 | 38 |
| ActBERT | HT (100M) | 8.6 | 23.4 | 33.1 | 36 |
| SupportSet | HT (100M) | 8.7 | 23.0 | 31.1 | 31 |
| MIL-NCE | HT (100M) | 9.9 | 24.0 | 32.4 | 29.5 |
| VideoCLIP | HT (100M) | 10.4 | 22.2 | 30.0 | - |
| FiT | Web2M + CC3M (5.5M) | 18.7 | 39.5 | 51.6 | 10 |
| ALPRO | Web2M + CC3M (5.5M) | 24.1 | 44.7 | 55.4 | 8 |

*FIG. 11*

| Method | PT datasets | R1↑ | R5↑ | R10↑ | MdR↓ |
|---|---|---|---|---|---|
| Finetuning | | | | | |
| S2VT | - | | | | 13 |
| FSE | - | 11.9 | 33.6 | | 11 |
| CE | - | 13.9 | 36.0 | | 8 |
| MoEE | - | 16.1 | 41.1 | | 8 |
| ClipBERT | COCO + VG (5.6M) | 16.1 | 41.2 | 55.2 | 6 |
| TT-CE | - | 20.4 | 48.0 | 60.8 | 6 |
| HT | Web2M + CC3M (5.5M) | 21.6 | 48.6 | 62.9 | 3 |
| | | 31.0 | 59.8 | 72.4 | |
| ALPro | Web2M + CC3M (5.5M) | 35.9 | 67.5 | 78.8 | 3 |
| Zero-shot | | | | | |
| VideoCLIP | HT (100M) | 16.6 | 46.9 | - | - |
| FiT | Web2M + CC3M (5.5M) | 21.1 | 46.0 | 56.2 | 7 |
| ALPro | Web2M + CC3M (5.5M) | 23.8 | 47.3 | 57.9 | 6 |

*FIG. 12*

| Method | PT datasets | MSRVTT | MSVD |
|---|---|---|---|
| E-SA | - | 29.3 | 27.6 |
| ST-TP | - | 30.9 | 31.3 |
| AMU | - | 32.5 | 32.0 |
| Co-mem | - | 32.0 | 31.7 |
| HME | - | 33.0 | 33.7 |
| LAGCN | - | - | 34.3 |
| HGA | - | 35.5 | 34.7 |
| QUEST | - | 34.6 | 36.1 |
| HCRN | - | 35.6 | 36.1 |
| ClipBERT | COCO + VG (5.6M) | 37.4 | - |
| SSML | HT (100M) | 35.1 | 35.1 |
| CoMVT | HT (100M) | 39.5 | 42.6 |
| VQA-T | HTVQA (69M) | 41.5 | 46.3 |
| ALPro | Web2M + CC3M (5.5M) | 42.1 | 45.9 |

*FIG. 13*

|  | MSRVTT-FT | | | MSRVTT-ZS | | | MSVD-QA |
|---|---|---|---|---|---|---|---|
|  | R1↑ | R10↑ | MdR↓ | R1↑ | R10↑ | MdR↓ | Acc.↑ |
| w/o ens. | 32.7 | 73.1 | 3 | 22.6 | 52.3 | 9 | 45.0 |
| with ens. | 33.9 | 73.2 | 3 | 24.1 | 55.4 | 8 | 45.9 |

FIG. 14

| #ent. | MSRVTT-FT | | | MSRVTT-ZS | | | MSVD-QA |
|---|---|---|---|---|---|---|---|
|  | R1↑ | R10↑ | MdR↓ | R1↑ | R10↑ | MdR↓ | Acc.↑ |
| 0 | 32.8 | 70.3 | 3 | 22.6 | 53.0 | 9 | 45.5 |
| 500 | 33.0 | 71.9 | 3 | 22.7 | 54.1 | 8 | 45.6 |
| 1000 | 33.9 | 73.2 | 3 | 24.1 | 55.4 | 8 | 45.9 |
| 2000 | 34.7 | 72.4 | 3 | 22.4 | 52.8 | 9 | 45.3 |

FIG. 15

| #frms | MSRVTT-FT | | | MSRVTT-ZS | | | MSVD-QA |
|---|---|---|---|---|---|---|---|
|  | R1↑ | R10↑ | MdR↓ | R1↑ | R10↑ | MdR↓ | Acc.↑ |
| 2 | 25.7 | 63.9 | 5 | 17.3 | 48.9 | 11 | 43.8 |
| 4 | 31.0 | 69.6 | 4 | 21.4 | 54.4 | 8 | 44.5 |
| 8 | 33.9 | 73.2 | 3 | 24.1 | 55.4 | 8 | 45.4 |
| 16 | 34.2 | 72.6 | 3 | 24.7 | 55.0 | 7 | 45.9 |

FIG. 16

SYSTEMS AND METHODS FOR VIDEO AND LANGUAGE PRE-TRAINING

CROSS-REFERENCE(S)

The application is a nonprovisional of and claims priority under 35 U.S.C. 119 to U.S. provisional application No. 63/279,986, filed Nov. 16, 2021, which is hereby expressly incorporated by reference herein in its entirety.

This application is related to U.S. nonprovisional application Ser. No. 17/566,061, filed on the same day, which is hereby expressly incorporated by reference herein in its entirety.

TECHNICAL FIELD

The embodiments relate generally to machine learning systems, and more specifically to systems and methods for video and language pre-training with contrastive learning and entity prompts.

BACKGROUND

Video-and-language (VL) alignment often refers to matching a video clip with a textual caption, e.g., a video is aligned with the text "a girl walks a dog in the park." A VL model may be pretrained to jointly learn multimodal representations for downstream tasks, such as text-video retrieval, video question answering, and/or the like. As videos often contain more redundancy in consecutive frames, to avoid the huge computational overhead in extracting video features, most existing systems obtain video features offline. But these offline approaches did not allow for fine tuning and did not transfer well to distinct target domains.

Therefore, there is a need for an efficient video and language pre-training mechanism.

BRIEF DESCRIPTION OF THE DRAWINGS

FIGS. 9-16 are example performance charts illustrating example performance of the video-and-language framework using entity prompt as described in FIGS. 2-8, according to some embodiments described herein.

Figure 1:
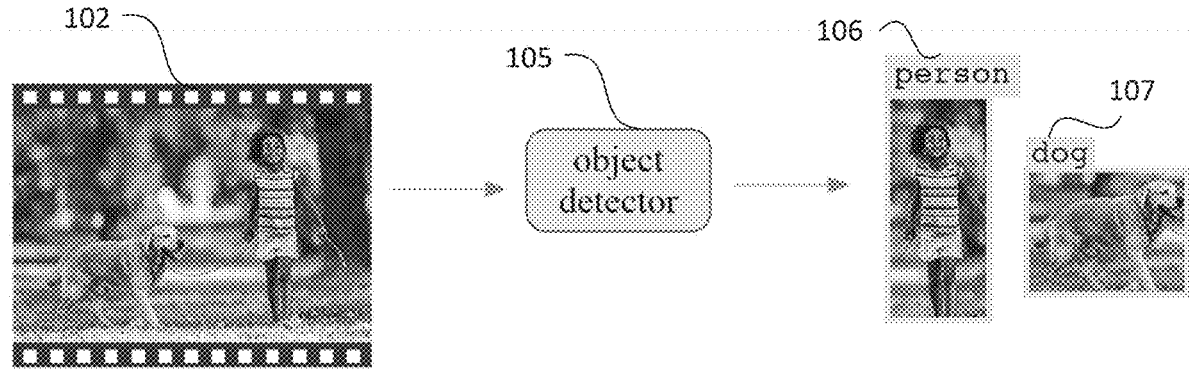
FIG. 1 is a simplified block diagram illustrating a prior art approach using object detectors to detect contents in a video frame, according to one embodiment described herein.

In the figures, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Traditionally, video and language alignment models often adopt an offline algorithm to extract video features to avoid huge online computational overhead. Some recent approaches may attempt to sample frames sparsely from video streams. However, these video-text pre-training models often fail to capture the interaction between video and text features which is commonly modeled trivially using either dot-product or cross modal transformer encoders. As features from individual modalities typically reside in different embedding spaces, such misalignment makes it less effective to directly model cross-modal interaction. In addition, existing visually-grounded pre-training tasks do not explicitly model fine-grained regional visual information (e.g. objects), which proves important for downstream tasks emphasizing on visual reasoning (e.g. video question answering). For example, previous sparse pre-training model is generally trained with image-text pairs using an image encoder, which makes it less effective in modeling temporal information.

In view of the need for improved video-text pre-training, embodiments described herein provide a sparse video-text pretraining based on sparsely sampled video frames and texts. Specifically, video frames are sparsely sampled from a video, such as a live stream. Sampled frames and texts are independently encoded using a transformer-based video encoder and a text encoder, respectively. A video-text contrastive loss is computed by comparing the outputs from the video encoder and the text encoder. The video encoder and the text encoder may then be jointly updated by at least the video-text contrastive loss. In this way, instance-level alignment is learned by applying the video-text contrastive loss on the unimodal features, which encourages paired video-text instances to have similar representations.

In addition, a multimodal encoder is employed to encode outputs from the video encoder and the text encoder to capture cross-modal interaction. Thus, entities appearing in randomly-selected video crops may be predicted using jointly video and text inputs. When entity annotations may be lacking, an entity prompter module is used to generate reliable pseudo-labels. Specifically, the entity prompter contains a video encoder and a text encoder to extract video and text features, respectively. The entity prompter may be separately trained using a video-text contrastive loss. Then while freezing the parameters of the entity prompter, video crops and text prompts (e.g., "A video of {Entity}.") are fed to the prompter, where each entity is from the frequent nouns appearing in the pretraining corpus. The normalized similarity between the entity prompts and the video crop are computed as the pseudo-label to supervise the pre-training based on the output of the multimodal encoder.

In this way, the align and prompt video-language pre-training framework learns both instance-level video-text alignment and fine-grained region-entity alignment through effectively learning cross-modal representations from sparse video frames and texts.

Overview

FIG. 1 is a simplified block diagram illustrating a prior art approach using object detectors to detect contents in a video frame, according to one embodiment described herein. Traditionally, existing systems adopt generated supervision for region-entity alignment. For example, an object detector 105 may receive a video frame 102 to identify the objects 106 and 107 from the frame. The computational overhead with the object detector 105 may be significant. In addition, object identification may have limited accuracy given the limited object categories, leaving text data unexploited.

Figure 2:
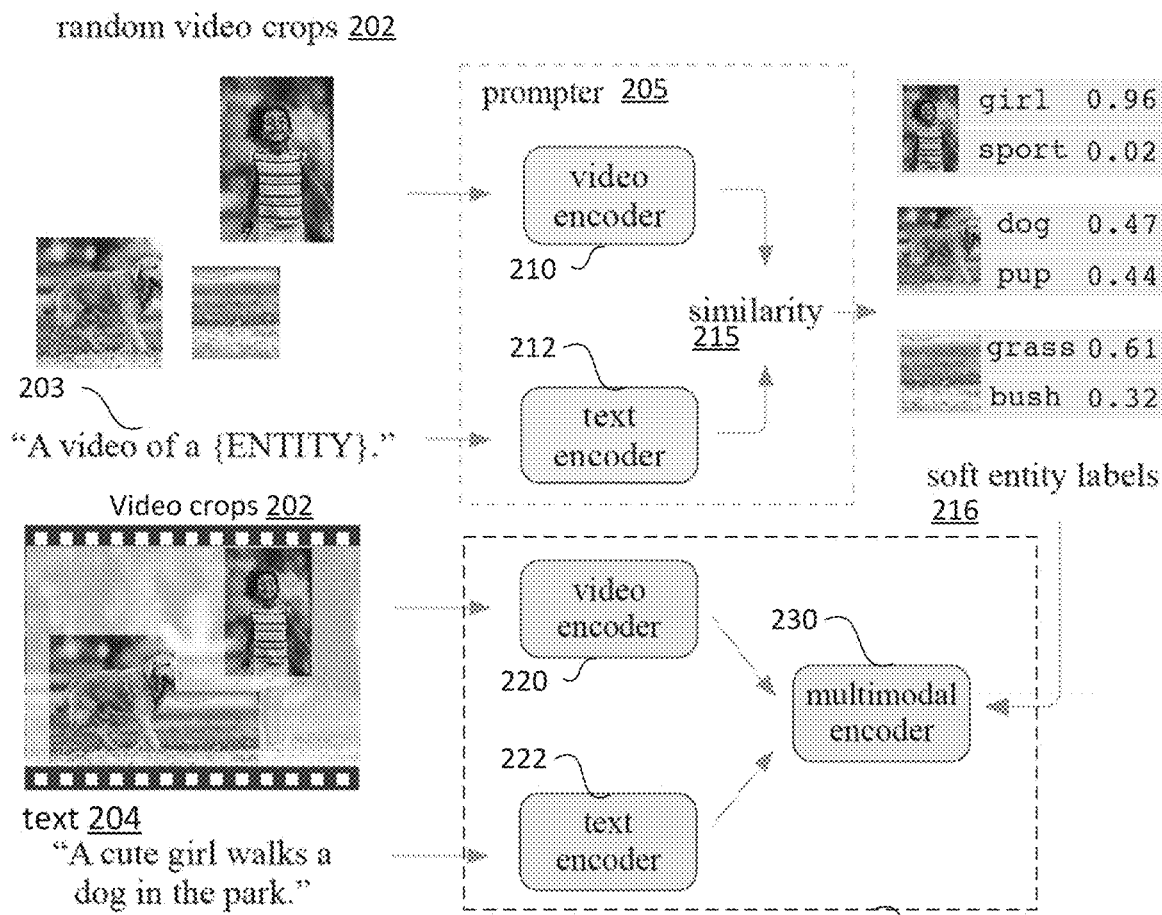
FIG. 2 is a simplified block diagram illustrating a video-and-language pretraining framework using generated soft labels using entity prompts, according to one embodiment described herein.

FIG. 2 is a simplified block diagram illustrating a video-and-language pretraining framework using generated soft labels using entity prompts, according to one embodiment described herein. The video-and-language pretraining framework comprises main modules, a video-language pre-training model 225 and a prompter 205.

In one embodiment, both modules 205 and 225 contain their own video encoder and text encoder to extract features for video and text inputs, respectively. Specifically, the pretraining model 225 predicts entities appearing in randomly-selected video crops 202 using jointly video and text inputs. A video encoder 220 and a text encoder 222 encode video crops 202 of a video frame 102, and the text input 204 of text descriptions, respectively. The pre-training module 225 further includes an additional multimodal encoder 230 to further capture the interaction between the two modalities output from the video encoder 220 and text encoder 222.

In one embodiment, the prompter 205 may be a stand-alone entity prompter module that generates reliable pseudo-labels. During training, the entity prompter 205 is trained by a contrastive loss (as further described in relation to module 330 in FIG. 3) and its parameters thereafter. Then during pre-training, random video crops 202 of a video frame 102, and an entity text descriptions 203 relating to what entity the video contains (e.g. "A video of {Entity}.") to the prompter. The entity mentioned in text description 203 is from the frequent nouns appearing in the pretraining corpus.

The video encoder 210 and the text encoder 212 within the prompter 205 are then configured to encode the video crops 202 and entity text 203, respectively. The prompter 205 then computes a similarity 215 between the outputs from the video encoder 210 ad text encoder 212, which in turn is generated as the soft entity labels 216. For example, the soft entity labels 216 may take a form of distributions of probabilities among classes of entities that each video crop may contain, e.g., one crops may contain the entity "girl" at a probability of 0.96, or the entity "sport" at a probability of 0.02, and/or the like.

The output of the multimodal encoder 230 may then be compared with the soft entity labels 216 to generate a training loss objective for the pre-training model 225. In this way, the prompter 205 serves to generate soft entity labels to supervise the pretraining of the video-language model.

Figure 3:
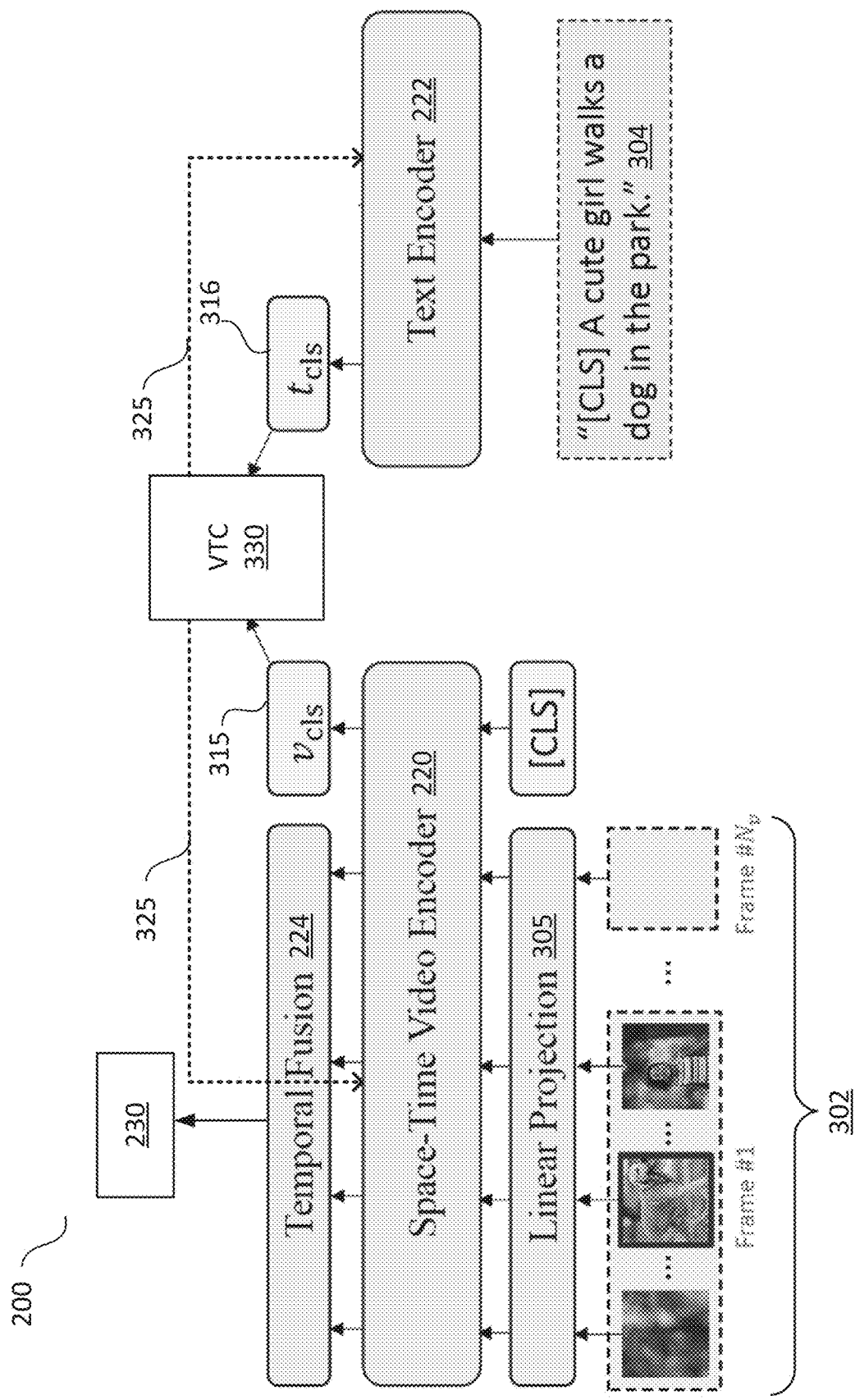
FIG. 3 is a simplified block diagram illustrating a video-text contrastive learning framework, according to one embodiment described herein.

FIG. 3 is a simplified block diagram illustrating a video-text contrastive learning framework, according to one embodiment described herein. The video encoder 220 and the text encoder 222 in the pretraining network 225 may be trained by a video-text contrastive (VTC) loss.

In one embodiment, the video encoder 220 may be a 12-layer TimeSformer to extract video features, with the height and width of input frames being 224. For example, the video input 302 may include $N_v$ frames that are sparsely sampled from each input video. The video encoder 220, the TimeSformer, may first partitions each frame into K non-overlapping patches, which are flattened and fed to a linear projection layer 305 to produce a sequence of patch tokens. Learnable positional embeddings are also added to the patch tokens from the linear projection layer 305. Then the TimeSformer applies self-attention along the temporal and spatial dimensions separately in order, leading to per-frame features $\tilde{v} \in \mathbb{R}^{N_p \times K \times d}$ with d the feature dimension.

The output of visual encoder 220 is a sequence of visual embeddings: $\{v_{cls}, v_1, \ldots, v_K\}$, with $v_i \in \mathbb{R}^d$ and $v_{cls}$ the embedding 315 of the video [CLS] token. The output of the video encoder 220 is also fed to a temporal fusion layer 222 (i.e. meanpooling), which is applied to $\tilde{v}$ along the temporal dimension to aggregate per-frame features into video features. The output of the temporal fusion layer is then fed to the multi-modal encoder 230, as further described in relation to FIG. 5.

In one embodiment, the text encoder 222 may be a 6-layer transformer model to represent text tokens in the text input 304. Given an input text description 304 of $N_t$ tokens, the text encoder 222 outputs an embedding sequence $\{t_{cls}, t_1, \ldots, t_{N_t}\}$, with $t_i \in \mathbb{R}^d$ and $t_{cls}$ the embedding 316 of the text [CLS] token. Similar to video encoder 220, positional embeddings are added to the text tokens.

Existing sparse video-language pre-training models use either dot-product or rely entirely on a transformer encoder to model cross-modal interactions. However, since video and text features reside in different embedding spaces, such methods lead to less satisfactory alignment. Instead, the video representation 315 and text representation 316 are fed to a video-text contrastive (VTC) loss module 330 to align features from the unimodal encoders 220 and 222 before sending them into the multimodal encoder 230. Specifically, given the embeddings of video [CLS] token 315 and the embedding 316 of text [CLS] tokens, a similarity score is computed between video V and text T:

$$s(V,T) = g_v(v_{cls}) \cdot g_t(t_{cls}) \quad (1)$$

In this way, paired video and text descriptions have higher similarity scores, where $g_v(\cdot)$ and $g_t(\cdot)$ are linear projections that transform the [CLS] embeddings to a common normalized low-dimensional (e.g. 256-d) space.

The contrastive loss considers matched pairs as positive and all others pairs that can be formed in a batch as negatives. For each input video-text pair $(V_i, T_i)$, the video-text contrastive loss module 330 then computes two symmetric terms, one for video-to-text classification:

$$\mathcal{L}_{v2t} = -\log \frac{\exp(s(V_i, T_i)/\tau)}{\sum_{j=1}^{B} \exp(s(V_i, T_j)/\tau)} \quad (2)$$

and the other for the text-to-video classification:

$$\mathcal{L}_{t2v} = -\log \frac{\exp(s(T_i, V_i)/\tau)}{\sum_{j=1}^{B} \exp(s(T_i, V_j)/\tau)} \quad (3)$$

where τ is a learnable temperature parameter, and B is the batch size. The video-text contrastive loss is then defined as the average of the two losses: $\mathcal{L}_{vtc}=(\mathcal{L}_{v2t}+\mathcal{L}_{t2v})/2$.

The VTC loss may then be used to update the video encoder 220 and the text encoder 222, e.g., via backpropagation paths 325.

Figure 4:
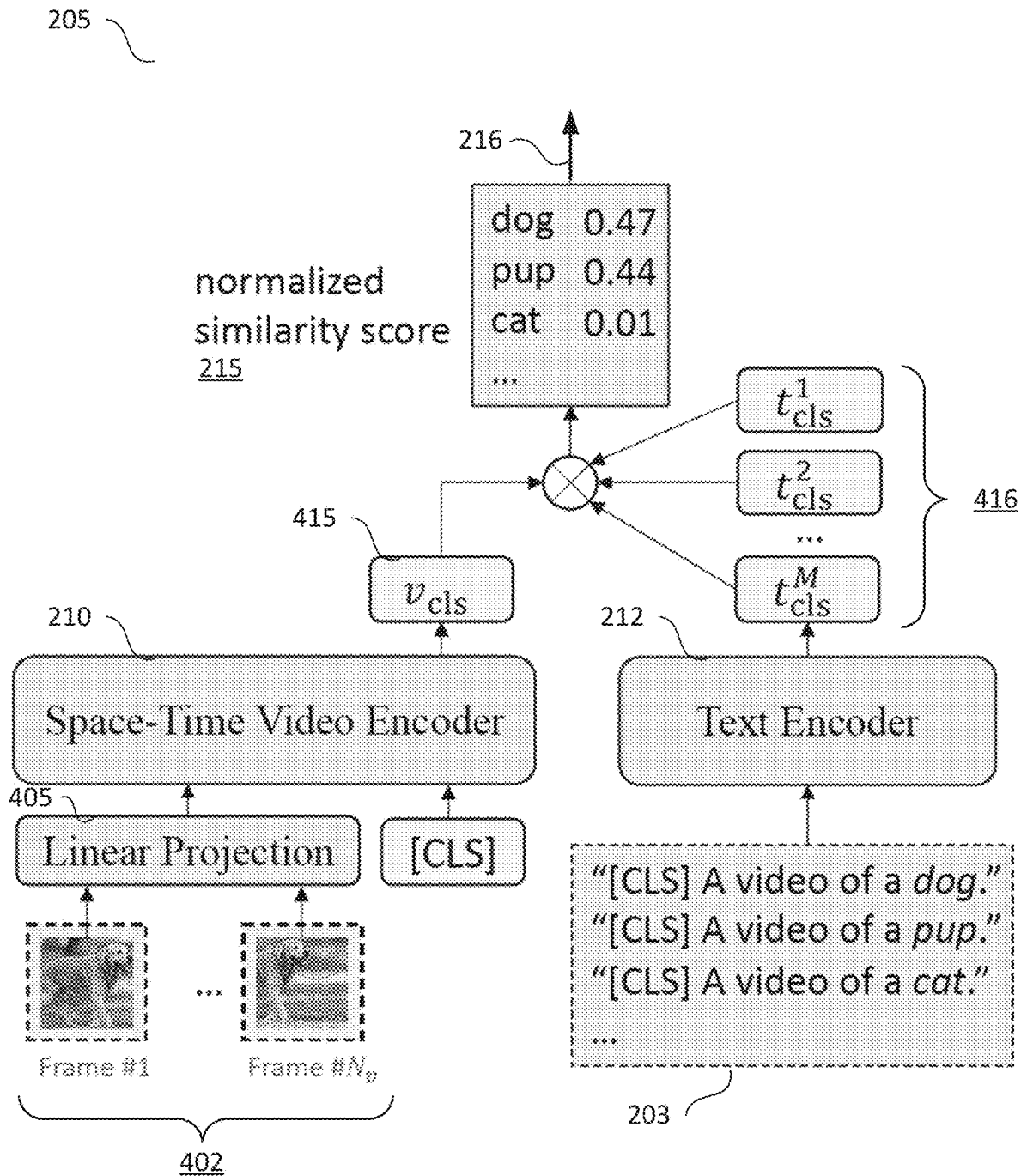
FIG. 4 is a simplified block diagram illustrating an entity prompt learning framework for generating soft labels, according to one embodiment described herein.

FIG. 4 is a simplified block diagram illustrating an entity prompter 205 for generating soft labels, according to one embodiment described herein. The prompter 205 serves to produce pseudo-labels of entity categories given a video crop, without dense annotations other than webly-sourced video-text pairs with possibly noisy alignment. Specifically, the prompter 205 including its video encoder 210 and text encoder 212, may be pretrained on video-text pairs, using a similar VTC loss as described in Eqs. (2) and (3). The parameters of the prompter 205 may then be frozen thereafter while being used for generating soft labels.

The prompter maintains a predetermined list of M text prompts. Each text prompt is an instantiation of a template, e.g. "A video of {ENTITY}." where ENTITY is a frequent noun in the pre-training corpus, such as dog, grass, sky, etc. After the prompter is pre-trained, the text encoder 212 of the prompter 205 computes the [CLS] embeddings 416 for each text prompt as $\{t_{cls}^1, t_{cls}^2, \ldots, t_{cls}^M\}$.

On the other hand, to generate entity labels, given one video input, a random video crop V (e.g. the same spatial region across sampled frames) is obtained and fed to a linear projection layer 405 that is similar to the linear projection layer 305. The video encoder 210 generates the [CLS] embedding 415 $\tilde{v}_{cls}$. The prompter then computes an entity pseudo-label 216 $q_{\hat{V}} \in \mathbb{R}^M$ for the video crop as the softmax-normalized similarity 215 between $\hat{v}_{cls}$ and all the prompt embeddings 416 $\{t_{cls}^1, t_{cld}^2, \ldots, t_{cls}^M\}$:

$$q_{\hat{V},m} = \frac{\exp(s(\hat{V}, T_m)/\tau)}{\sum_{m=1}^{M} \exp(s(\hat{V}, T_m)/\tau)} \quad (4)$$

For example, as shown in FIG. 4, the pseudo label 216 may take a form of probability distribution among the M classes of entities. The pseudo label 216 is then sent to supervise the pre-training of the video-and-language module 225, as further described in FIG. 5.

Figure 5:
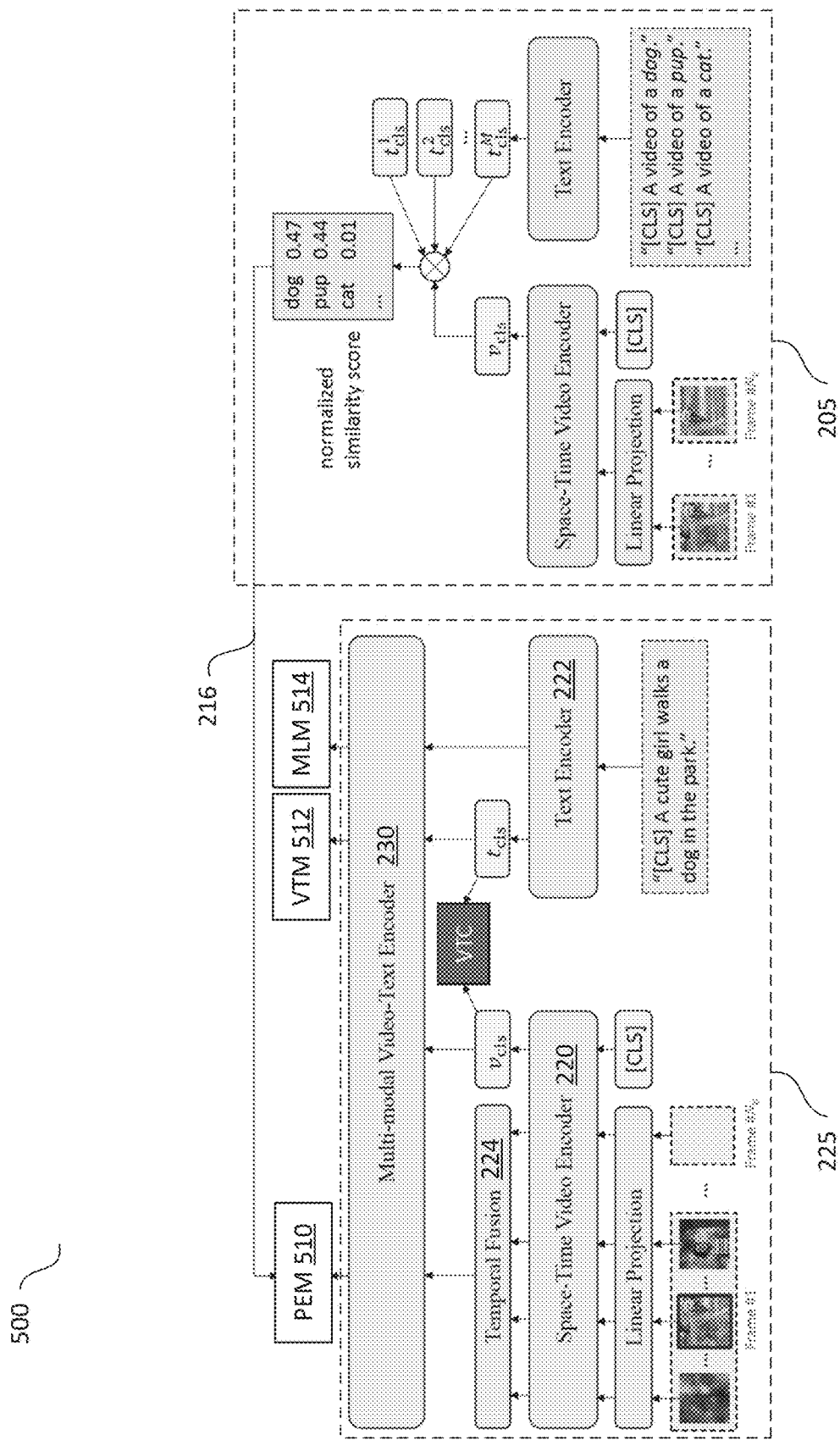
FIG. 5 is a simplified block diagram illustrating joint training of video-text contrastive learning shown in FIG. 3 and entity prompt learning shown in FIG. 4, according to one embodiment described herein.

FIG. 5 is a simplified block diagram illustrating joint training of video-and-language module 225 based on entity prompt learning shown in FIG. 4, according to one embodiment described herein. As described in relation to FIG. 3, a temporal fusion layer 224 may be applied to the output of the space-tie video encoder 220. The output of the temporal fusion layer 224, together with the video [CLS] embedding may then be fed to the multi-modal video-text encoder 230. Mean pooling may be applied on the embeddings from the multimodal encoder 230 that correspond to the spatial location of the video crop $\hat{V}$, denoted as $e_{\hat{V}} \in \mathbb{R}^d$. A classifier (e.g. a multi-layer perceptron) may be used to compute the softmax-normalized entity prediction $p_{\hat{V}}$. The prompting entity modeling (PEM) loss module 510 may then compute the cross entropy loss between $p_{\hat{V}}$ and the entity pseudo-label 216 $q_{\hat{V}}$:

$$\mathcal{L}_{pem} = -\Sigma_{m=1}^{M} q_{\hat{V},m} \cdot \log p_{\hat{V},m} \quad (5)$$

Prompting entity modeling features a diverge range of entities while requiring no extra human annotations, which yields an efficient and scalable solution to generate visually grounded regional supervisions for cross-modal learning.

In one embodiment, the multi-modal video-text encoder 230 may be further trained by other loss objectives. For example, masked language modeling (MLM) loss $L_{mlm}$ and video-text matching (VTM) loss $L_{vtm}$ may be adopted.

The MLM objective utilizes both video and the contextual text to predict the masked text tokens. Specifically, input tokens (both video and text) may be randomly masked with a probability of 15% and replace them with a special token [MASK]. The resulting embeddings from the video encoder 220, text encoder 222 are then passed to the multi-modal encoder 230 to generate embeddings for the MLM loss module 514. The MLM loss module 514 may then predict the masked text tokens and compare the predicted masked tokens with the actual masked tokens to compute a MLM loss.

Video-text matching is a binary classification task which predicts whether a video and a text description are matched with each other. For example, the multimodal [CLS] token ea, may be used as the joint representation of the video-text pair. The VTM module 512 may then classify the joint representation to generate an output distribution indicating whether the video input and the text input match. The VTM loss may then be computed as the cross entropy loss between the predicted match and the actual match. Negative samples are generated from non-parallel video-text pairs from the batch. Contrastive hard negative mining may be adopted to find more informative in-batch negatives for VTM.

Thus, the overall pre-training objective may be the weighted sum of the losses computed from modules 330, 510, 512 and 514:

$$\mathcal{L} = \mathcal{L}_{pem} + \mathcal{L}_{VTC} + \mathcal{L}_{MLM} + \mathcal{L}_{VTM}$$

In this way, the multi-modal encoder 230, the video encoder 220 and the text encoder 222 may be jointly updated based on the overall pre-training objective.

Computer Environment

Figure 6:
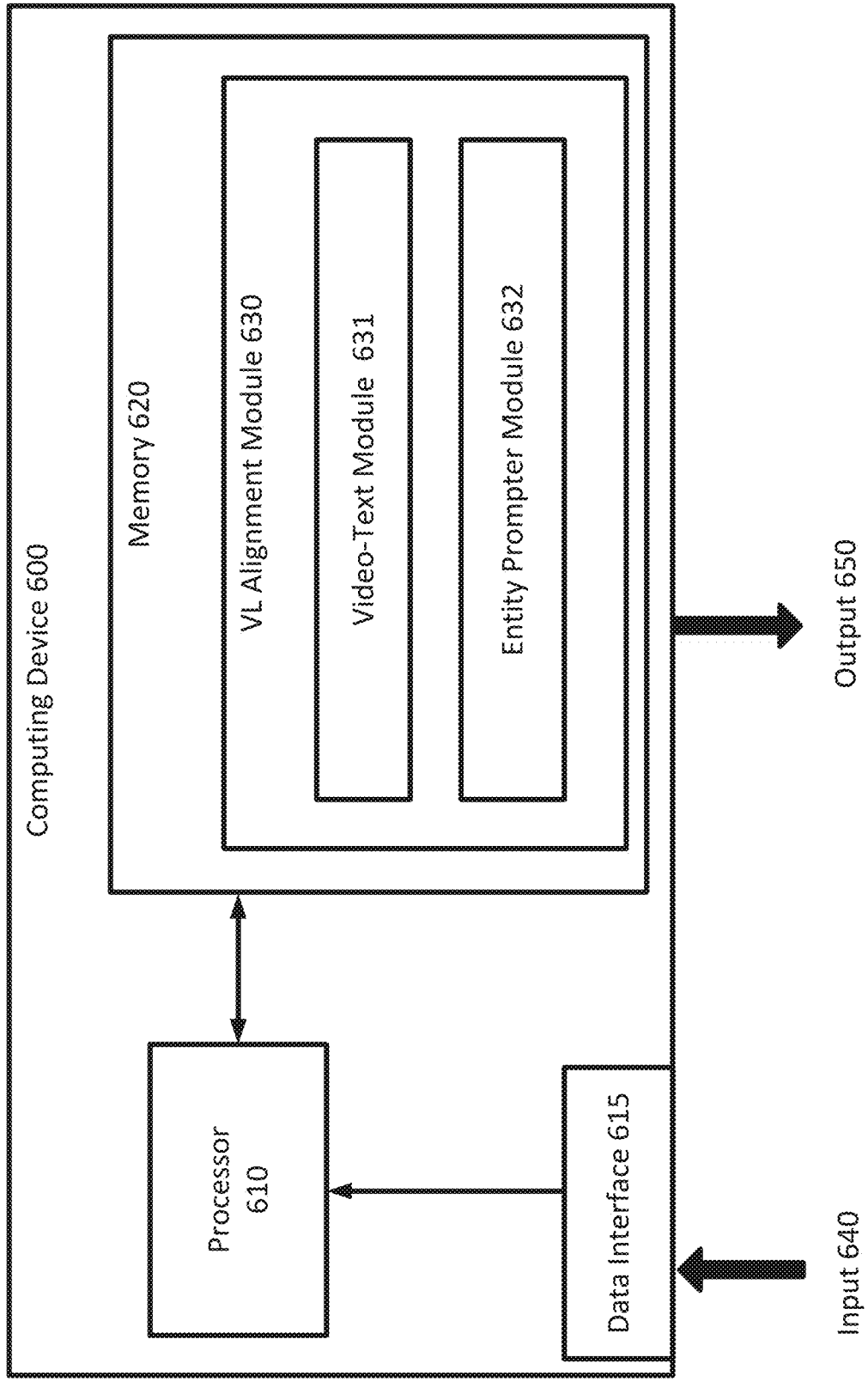
FIG. 6 is a simplified diagram of a computing device that implements the video and language pre-training, according to some embodiments described herein.

FIG. 6 is a simplified diagram of a computing device that implements the video and language pre-training, according to some embodiments described herein. As shown in FIG. 6, computing device 600 includes a processor 610 coupled to memory 620. Operation of computing device 600 is controlled by processor 610. And although computing device 600 is shown with only one processor 610, it is understood that processor 610 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 600. Computing device 600 may be implemented as a stand-alone subsystem, as a board added to a computing device, and/or as a virtual machine.

Memory 620 may be used to store software executed by computing device 600 and/or one or more data structures used during operation of computing device 600. Memory 620 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 610 and/or memory 620 may be arranged in any suitable physical arrangement. In some embodiments, processor 610 and/or memory 620 may be implemented on a same board, in a same package (e.g., system-in-package), on a same chip (e.g., system-on-chip), and/or the like. In some embodiments, processor 610 and/or memory 620 may include distributed, virtualized, and/or containerized computing resources. Consistent with such embodiments, processor 610 and/or memory 620 may be located in one or more data centers and/or cloud computing facilities.

In some examples, memory 620 may include non-transitory, tangible, machine readable media that includes executable code that when run by one or more processors (e.g., processor 610) may cause the one or more processors to perform the methods described in further detail herein. For example, as shown, memory 620 includes instructions for a video-and-language alignment module 630 that may be used to implement and/or emulate the systems and models, and/or to implement any of the methods described further herein. In some examples, the video-and-language alignment module 630, may receive an input 640, e.g., such as video and/or text inputs, via a data interface 615.

For example, the input 640 may include data from a webly-sourced dataset WebVid-2M, which contains 2.5M video-text pairs. In addition, as pretraining with image-pairs can improve spatial representations of videos, input data 640 may also include data from CC-3M. During pre-training, images are duplicated from CC-3M to make static videos. This in total amounts to 5.5M video-text pairs, which is an order of magnitude less than the commonly-adopted HowTo100M.

The data interface 615 may be any of a user interface that receives a user uploaded image instance of a form, or a communication interface that may receive or retrieve a previously stored video and/or text inputs from the database. The video-and-language alignment module 630 may generate an output 650, such as an alignment prediction between the video and text inputs.

In some embodiments, the video-and-language pre-training module 630 may further include a video-text module 631 (similar to the video-text pre-training module 225 shown in FIG. 5) and an entity prompter module 632 (similar to the prompter 205 shown in FIG. 5).

In some implementations, the video-and-language alignment module 630 and its submodules 631-632 may be implemented via hardware, software and/or a combination thereof.

Example Workflow

Figure 7:
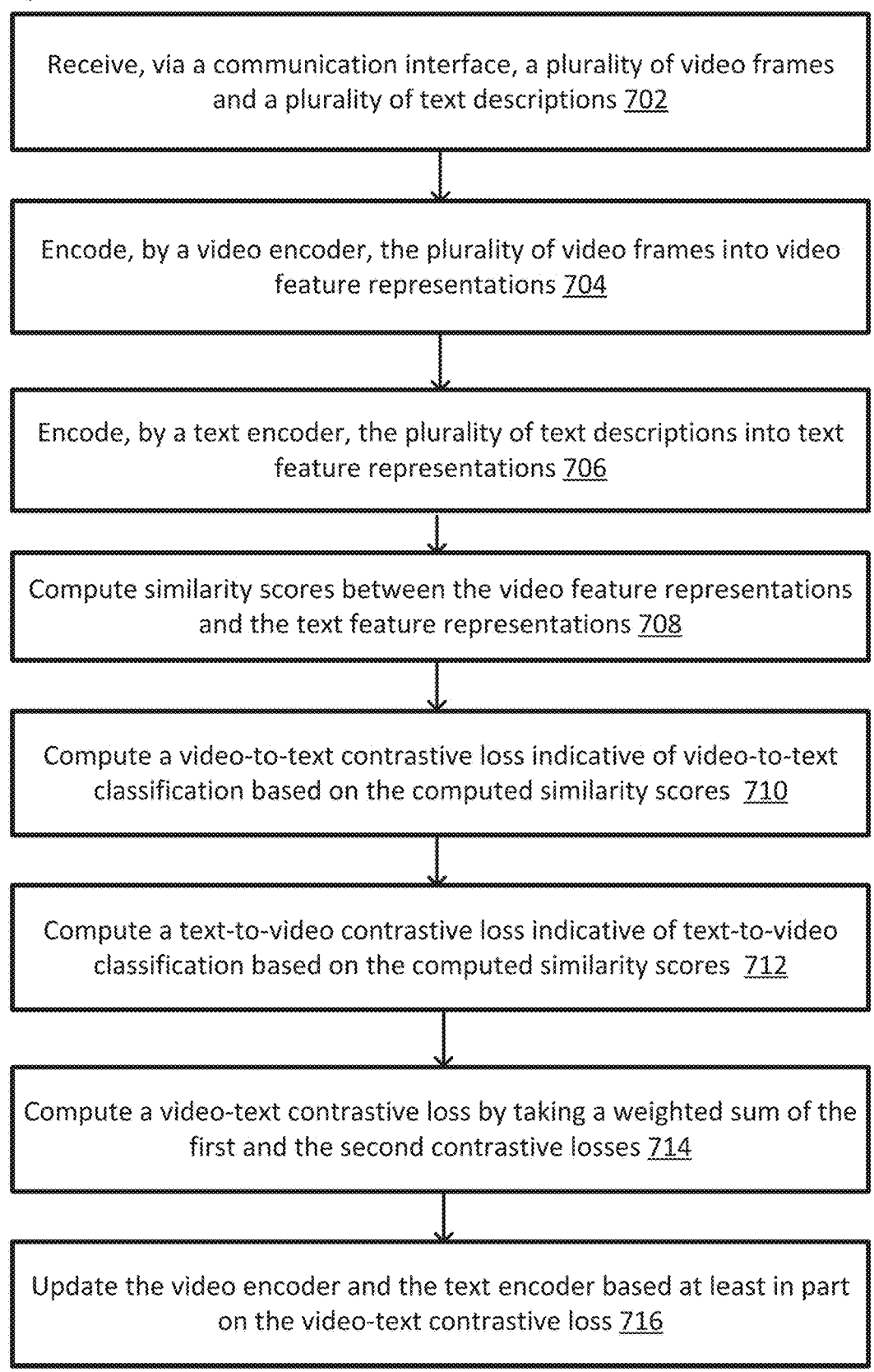
FIG. 7 is a simplified logic flow diagram illustrating a method of training and using a video-text entity prompt network to generate soft labels, according to some embodiments described herein.

FIG. 7 is a simplified logic flow diagram illustrating a method of training and using a video-text entity prompt network to generate soft labels, according to some embodiments described herein. One or more of the processes of method 700 may be implemented, at least in part, in the form of executable code stored on non-transitory, tangible, machine-readable media that when run by one or more processors may cause the one or more processors to perform one or more of the processes. In some embodiments, method 700 corresponds to the operation of the video-and-language alignment module 630 (FIG. 6) to perform video-and-language alignment contrastive pretraining.

At step 702, a plurality of video frames (e.g., 302 in FIG. 3) and a plurality of text descriptions (e.g., 304 in FIG. 3) may be obtained, via a data interface (e.g., 615 in FIG. 6). For example, the plurality of video frames may be sparsely sampled from a video stream.

At step 704, a video encoder (e.g., 220 in FIG. 3) may encode the plurality of video frames into video feature representations. For example, each video frame may be partitioned into a number of non-overlapping patches. The number of non-overlapping patches may be fed to a linear projection layer to produce a sequence of patch tokens. A video start token may be appended to the sequence of patch tokens. Self-attention may then be applied along a temporal dimension and a spatial dimension to an input sequence of tokens to result in per-frame features, and temporal fusion may then be applied to the per-frame features along the temporal dimension to aggregate per-frame features into video features. The video feature representations comprise a sequence of visual embeddings including an embedding of a video start token, e.g., [CLS] token.

At step 706, a text encoder (e.g., 222 in FIG. 3) may encode the plurality of text descriptions into text feature representations.

At step 708, similarity scores may be computed between the video feature representations and the text feature representations. For example, an embedding of the video start token [CLS] from the video encoder may be transformed into a normalized video embedding. The embedding of a text start token [CLS] from the text encoder may be transformed into a normalized text embedding. A dot product of the normalized video embedding and the normalized text embedding may be computed as the similarity score, e.g., according to Eq. (1).

At step 710, a first contrastive loss indicative of video-to-text classification may be computed based on the computed similarity scores, e.g., according to Eq. (2).

At step 712, a second contrastive loss indicative of text-to-video classification may be computed based on the computed similarity scores, e.g., according to Eq. (3).

At step 714, a video-text contrastive loss may be computed by taking a weighted sum of the first and the second contrastive losses, e.g., by taking an average of (2) and (3).

At step 716, the video encoder and the text encoder may be updated based at least in part on the video-text contrastive loss.

Figure 8:
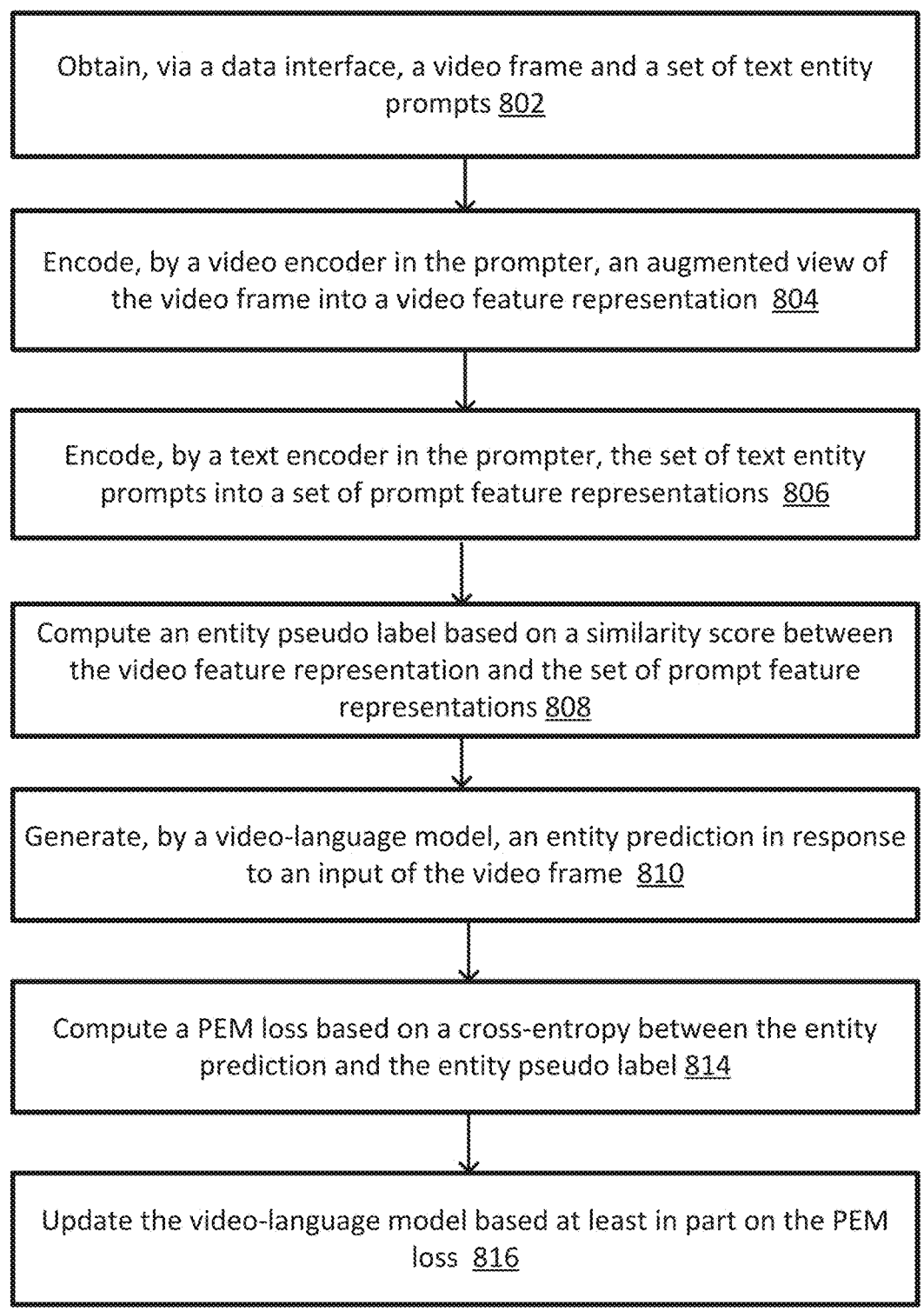
FIG. 8 is a simplified logic flow diagram illustrating a method of joint training of a video-and-language network using the soft labels, according to some embodiments described herein.

FIG. 8 is a simplified logic flow diagram illustrating a method of joint training of a video-and-language network using the soft labels, according to some embodiments described herein. One or more of the processes of method 700 may be implemented, at least in part, in the form of executable code stored on non-transitory, tangible, machine-readable media that when run by one or more processors may cause the one or more processors to perform one or more of the processes. In some embodiments, method 700 corresponds to the operation of the video-and-language alignment module 630 (FIG. 6) to perform joint training of a video-and-language network using entity prompts.

At step 802, a video frame (e.g., 402 in FIG. 4) and a set of text entity prompts (e.g., 203 in FIG. 4) may be obtained via a data interface (e.g., 615 in FIG. 6). For example, each text entity prompt from the set of text entity prompts takes a pre-determined format identifying a frequent noun in a pretraining corpus.

At step 804, a video encoder (e.g., 210 in FIG. 4) may encode an augmented view of the video frame into a video feature representation. For example, the video feature representation comprises an embedding of a video start token [CLS].

At step 806, a text encoder (e.g., 212 in FIG. 4) may encode the set of text entity prompts into a set of prompt feature representations.

At step 808, an entity pseudo label may be computed based on a similarity score between the video feature representation and the set of prompt feature representations. For example, the entity pseudo label is computed by taking a softmax-normalized similarity between the embedding of the video start token [CLS] 415 and the set of prompt feature representations 416, e.g., according to Eq. (4).

At step 810, a video-language model may generate an entity prediction in response to an input of the video frame. For example, the video-language model comprises a video encoder (e.g., 220 in FIG. 5), a text encoder (e.g., 222 in FIG. 5) and a multi-modal video-text encoder (e.g., 230 in FIG. 5). The video encoder may encode the video frame into a video feature representation. The text encoder may encode a text descriptions into a text feature representation. The multi-modal video-text encoder may encode the video feature representation and the text feature representation into a set of multimodal embeddings. A classifier may be used to generate the entity prediction from the set of multimodal embeddings.

At step 812, a first loss may be computed based on a cross-entropy between the entity prediction and the entity pseudo label, e.g., according to Eq. (5).

At step 814, the video-language model may be updated based at least in part on the first loss.

Example Implementations and Performance

FIGS. 9-16 are example performance charts illustrating example performance of the video-and-language framework using entity prompt as described in FIGS. 2-8, according to some embodiments described herein. Data experiments may be conducted with implementation details below.

In one implementation, the spatial and temporal attention blocks of the video encoder 210 (e.g., TimeSformer) can be initialized by reusing ViT-B/16 weights pre-trained on ImageNet-21k (described in Dosovitskiy et al., An image is worth 16×16 words: Transformers for image recognition at scale, in Proceedings of International Conference on Learning Representations, 2020).

Text encoders 212 are initialized using the first 6-layer of the BERTbase model, and the multimodal encoder 230 is initialized using the last 6-layers weights of BERTbase. The video-text pre-training model 225 is pre-trained for 100k iterations, roughly equivalent to 10 epochs, using a batch size of 256 on 16 NVIDIA A100 GPUs. AdamW (described in Loshchilov et al., Decoupled weight decay regularization, in proceedings of International Conference on Learning Representations, 2018) optimizer may be used to update the model with a weight decay of 0.001. The learning rate is first warmed-up to 1e-4, then it follows a linear decay schedule. Since videos are usually of different aspect ratios, videos are first rescaled to 224×224. For each video, 4 frames are randomly sampled as inputs to the visual encoder 210 while preserving their orderings in-between. For PEM, POS tagger is used and the top 1k are most frequent nouns as the entity names. Random video crops are obtained occupying 30%-50% of the original spatial area as inputs to the prompter. A pseudo-label may be discarded if the most likely entity has a normalized similarity score smaller than 0.2.

Several example downstream tasks are tested on the pretrained video-text model. For the text-video retrieval task, training datasets include (i) MSRVTT (described in Xu et al., MSR-VTT: A large video description dataset for bridging video and language, in Proceedings of the IEEE conference on computer vision and pattern recognition, pages 5288-5296, 2016) which contains 10K videos with 200K text captions. 7k videos are used for training and report results on the 1k test split. (ii) DiDeMo (described in Hendricks et al., Localizing moments in video with natural language, in Proceedings of the IEEE international conference on computer vision, pages 5803-5812, 2017) which contains 10k videos from Flickr with 40k text descriptions. Paragraph-to-video retrieval is evaluated, where sentence descriptions for each video are concatenated together as a single text query.

For the downstream task of video question answering, the task of open-ended video question answering is focused on. Example datasets include (i) MSVD-QA (described in Xu et al., Video question answering via gradually refined attention over appearance and motion, in Proceedings of the ACM international conference on Multimedia, pages 1645-1653, 2017) which is built upon videos and text descriptions from MSVD (described in Chen et al., Collecting highly parallel data for paraphrase evaluation, in Proceedings of the 49$^{th}$ annual meeting of the association for computational linguistics: human language technologies, pages 190-200, 2011). The MSVD-QA dataset has in total 1,970 videos and 50k question answer pairs, with 2,423 answer candidates. (ii) MSRVTT-QA (described in Xu et al. referenced above) which is built upon videos and captions from MSRVTT, which contains 10k videos with 243k open-ended questions and 1.5k answer candidates.

On downstream tasks, the video-text alignment model allows end-to-end finetuning of the video backbone with raw video frames as input. During finetuning, N frames are randomly sampled per video, where N=8 for retrieval and N=16 for QA. Temporal position embeddings in the video encoder 210 or 220 (e.g., TimeSformer) are interpolated to accommodate different number of input frames. During inference, frames are uniformly sampled to ensure reproducibility.

To keep pre-training and finetuning setups consistent, all the videos are resized to 224×224 before feeding them into the model. Although this does not maintain the original aspect ratios, no significant performance drop is observed as the pre-training dataset contains videos of various aspect ratios.

For finetuning on retrieval, the video-text matching head is used during pre-training and optimize the sum of both VTC and VTM losses. Similarity scores are computed from the output of VTM head during inference. For QA task, a simple MLP is added on the multimodal [CLS] token for classification and optimize the conventional cross-entropy loss between predictions and ground-truth answer labels. During inference, predictions are obtained as the answer with the highest probability. All the finetuning experiments are performed on 8 NVIDIA A100 GPUs, taking one to five hours to complete depending on the datasets.

Figures 9, 10A, 10B:
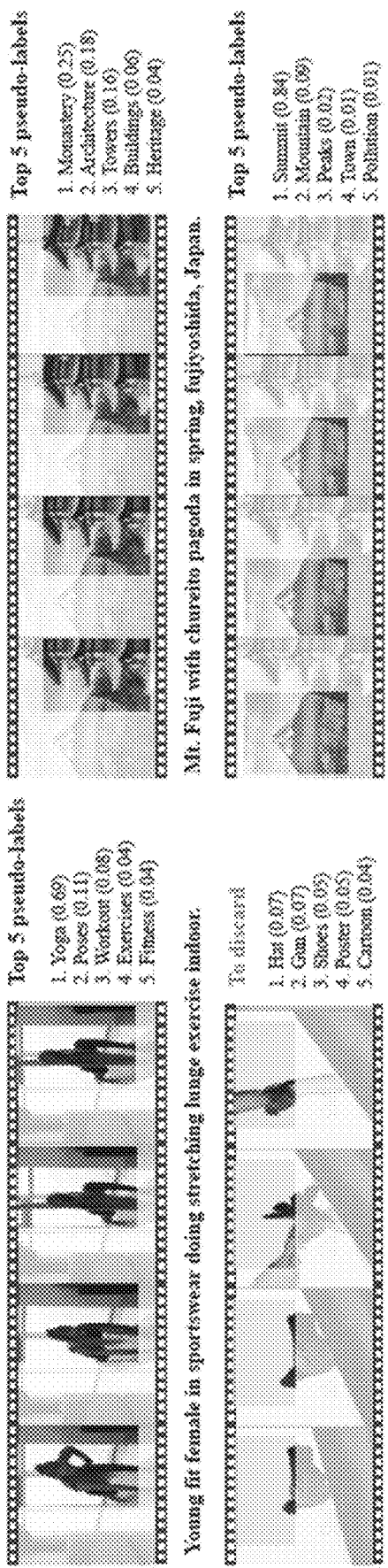

FIG. 9 shows the performance parameters of the pre-training methods described herein (i.e. video-text contrastive loss and prompting entity modeling). Compared with pre-training using only MLM and VTM, both PEM and VTC substantially improve the performance across all the datasets. VTC is in particular useful for the retrieval task. The reason is that the VTC loss explicitly maximizes the instance-level similarity between positive video-text pairs, which is well aligned with the goal of retrieval. We notice that PEM significantly improves the performance of videoQA, especially on MSVD-QA, due to its ability to learn finer-grained regional features.

While enabling both PEM and VTC losses has complementary effects for most datasets, we also observe it leads to slightly worse accuracy on MSVD-QA. It is observed that MSVD-QA contains more questions requiring region-level knowledge, including object categories (e.g. dough, swords), animal species (e.g. hare, eagle) and scenes (e.g. river, cliff), which can be well modeled using PEM, rendering the impact of VTC negligible. In contrast, MSRVTT-QA involves more coarse-grained visual information such as activities. As a result, using both PEM and VTC complements with each other on MSRVTT-QA.

FIGS. 10A-10B show examples of pseudo-labels generated by the prompter module 205. The pre-training approach described herein generates a more diverse range of entity categories beyond typical object classes from detection annotations. This is in particular beneficial when downstream tasks require a large vocabulary, such as open-ended videoQA.

FIGS. 11-12 compare the video-and-language alignment model with existing methods using finetuning and zero-shot text-to-video retrieval on MSRVTT and DiDeMo datasets, respectively. Existing methods include: JSFusion described in Yu et al., A joint sequence fusion model for video question answering and retrieval, in Proceedings of the European Conference on Computer Vision, pages 471-487, 2018; HT100M described in Miech et al., Howto100m: Learning a text-video embedding by watching hundred million narrated video clips, in Proceedings of the IEEE/CVF International Conference on Computer Vision, pages 2630-2640, 2019; ActBERT described in Zhu et al., Actbert: Learning global-local video-text representations, in Proceedings of the IEEE/CVF conference on computer vision and pattern recognition, pages 8746-8755, 2020; NoiseEst described in Armrani et al., Noise estimation using density estimation for self-supervised multimodal learning, in Proceedings of the AAAI Conference on Artificial Intelligence, volume 35, pages 6644-6652, 2021; HERO described in Fan et al., Heterogeneous memory enhanced multimodal attention model for video question answering, in Proceedings of the IEEE/CVF conference on computer vision and pattern recognition, pages 1999-2007, 2019; ClipBERT described in Lei et al., Less is more: Clipbert for video-and-language learning via sparse sampling, in Proceedings of the IEEE/CVF Conference on Computer Vision and Pattern Recognition, pages 7331-7341, 2021; AVLNet described in Le et al., Hierarchical conditional relation networks for video question answering, in Proceedings of the IEEE/CVF conference on computer vision and pattern recognition, pages 9972-9981, 2020; VideoClip described in Xu et al., Videoclip: Contrastive pre-training for zero-shot video-text understanding, in Proceedings of the Conference on Empirical Methods in Natural Language Processing, pages 6787-6800, 2021; SupportSet described in Patrick et al., Support-set bottlenecks for video-text representation learning, in Proceedings of International Conference on Learning Representations, 2021; FiT described in Bain et al., Frozen in time: A joint video and image encoder for end-to-end retrieval, in proceedings of IEEE International Conference on Computer Vision, 2021; MIL-NCE described in Miech et al., End-to-end learning of visual representations from uncurated instructional videos, in Proceedings of the IEEE/CVF Conference on Computer Vision and Pattern Recognition, pages 9879-9889, 2020; S2VT described in Venugopalan et al., Translating videos to natural language using deep recurrent neural networks, in proceedings of HLT-NAACL, 2015; FSE described in Zhang et al., Cross-modal and hierarchical modeling of video and text, in Proceedings of the European Conference on Computer Vision, pages 374-390, 2018; CE described in Liu et al., Use what you have: Video retrieval using representations from collaborative experts, in British Machine Vision Conference, 2019; MoEE described in Miech et al., Learning a text-video embedding from incomplete and heterogeneous data, arXiv preprint arXiv:1804.02516, 2018; TT-CE described in Croitoru et al., Teachtext: Crossmodal generalized distillation for textvideo retrieval, in Proceedings of the IEEE/CVF International Conference on Computer Vision, pages 11583-11593, 2021.

The video-and-language alignment model (denoted by "AlPro" in FIGS. 11-12) surpasses previous methods by a significant margin while exploiting orders of magnitude less video-text pairs with no human-written texts required. On both datasets, the video-and-language alignment model obtains more than 6% lift in terms of R10 scores.

FIG. 13 compares the video-and-language alignment model with existing methods on open-ended video question answering datasets MSRVTT-QA and MSVD-QA. Example methods include those used in relation to FIGS. 11-12, and E-SA described in Xu et al., Video question answering via gradually refined attention over appearance and motion, in Proceedings of the ACM international conference on Multimedia, pages 1645-1653, 2017; ST-TP described in Jang et al., Tgif-qa: Toward spatio-temporal reasoning in visual question answering. In Proceedings of the IEEE conference on computer vision and pattern recognition, pages 2758-2766, 2017; AMU described in Xu et al., Video question answering via gradually refined attention over appearance and motion, in Proceedings of the ACM international conference on Multimedia, pages 1645-1653, 2017; Co-mem described in Gao et al., Motion-appearance co-memory networks for video question answering. In Proceedings of the IEEE Conference on Computer Vision and Pattern Recognition, pages 6576-6585, 2018; HME described in Fan et al., Heterogeneous memory enhanced multimodal attention model for video question answering, in Proceedings of the IEEE/CVF conference on computer vision and pattern recognition, pages 1999-2007, 2019; LAGCN described in Huang et al., Location-aware graph convolutional networks for video question answering, in Proceedings of the AAAI Conference on Artificial Intelligence, volume 34, pages 11021-11028, 2020; HGA described in Jiang et al., Reasoning with heterogeneous graph alignment for video question answering, in Proceedings of the AAAI Conference on Artificial Intelligence, volume 34, pages 11109-11116, 2020; QUEST described in Jiang et al., Divide and conquer: Question-guided spatiotemporal contextual attention for video question answering, in Proceedings of the AAAI Conference on Artificial Intelligence, volume 34, pages 11101-11108, 2020; HCRN described in Le et al., Hierarchical conditional relation networks for video question answering. in Proceedings of the IEEE/CVF conference on computer vision and pattern recognition, pages 9972-9981, 2020; SSML and CoMVT described in Amrani et al., Noise estimation using density estimation for self-supervised multimodal learning, in Proceedings of the AAAI Conference on Artificial Intelligence, volume 35, pages 6644-6652, 2021; VQA-T described in Yang et al., Just ask: Learning to answer questions from millions of narrated videos, in Proceedings of the IEEE/CVF International Conference on Computer Vision, pages 1686-1697, 2021.

Most competitors have QA-specific architectures while that of video-and-language alignment model is generic for other video language tasks, such as retrieval. It is observed that the video-and-language model achieves on-par results with VQA-T, which exploits 69M QA-specific domain data for pre-training. In contrast, video-and-language alignment model uses only 5.5M video-text pairs from the web without domain knowledge.

It is observed that video-and-language alignment model (ALPRO) surpasses other methods by a substantial margin, with 2.6% and 3.3% lift in accuracy. This demonstrates the competitive visual reasoning ability of ALPRO.

It is observed that it is important to design and ensemble prompts with multiple templates. Without much engineering effort, a preliminary set of prompt templates are adopted, such as "A video of a {ENTITY}", "A footage of one {ENTITY}" for video inputs; "A photo of a {ENTITY}" and "A picture of the {ENTITY}" for image inputs. In total, 12 templates are used for video and image inputs each. The ensemble is built by averaging over the $t_{cls}$ embeddings of prompts instantiated with the same entity. The effect of prompt ensembling is shown in FIG. 14. Despite minimal engineering efforts (only experimented with a single set of templates), prompt ensembling demonstrates its importance in generating high-quality pseudo-labels.

The effect of the number of entities for PEM is further shown in FIG. 15. Compared with the model pre-trained with MLM+VTM+VTC, adding PEM brings consistent improvement with frequent entities. This suggests that the underlying principle of PEM to learn better region-entity alignment plays the essential role in its effectiveness. However, adding more low-frequency entities introduces noises in generating entity pseudo-labels, thus harming the pre-training.

FIG. 16 shows the effect of number of frames. In FIG. 16, the results on downstream tasks with different numbers of input frames are provided. Generally more frames lead to better performance, while such benefit saturates with more than 8 frames on the retrieval task. By sparsely sampling frames from the video and enabling end-to-end training of the visual backbone, the video-and-language alignment model ("ALPRO") learns more effective representations than previous methods that use fixed offline features.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of video-and-language alignment contrastive pretraining, the method comprising:
   obtaining, via a data interface, a plurality of video frames and a plurality of text descriptions corresponding to the plurality of video frames;
   encoding, by a video encoder, the plurality of video frames into video feature representations;
   encoding, by a text encoder, the plurality of text descriptions into text feature representations;
   computing similarity scores between the video feature representations and the text feature representations;
   computing a first contrastive loss based at least in part on an exponential of computed similarity scores corresponding to a matching pair of a first video frame and a first text description and one or more pairs of the first video frame and text descriptions that do not match the first video frame;
   computing a second contrastive loss based at least in part on an exponential of computed similarity scores corresponding to the matching pair of the first video frame and the first text description and one or more pairs of the first text description and video frames that do not match the first text description;
   computing a video-text contrastive loss by taking a weighted sum of the first and the second contrastive losses; and
   updating the video encoder and the text encoder based at least in part on the video-text contrastive loss.

2. The method of claim 1, wherein the plurality of video frames are sparsely sampled from a video stream.

3. The method of claim 1, further comprising:
   partitioning each video frame into a number of non-overlapping patches;
   feeding the number of non-overlapping patches to a linear projection layer to produce a sequence of patch tokens;
   appending a video start token to the sequence of patch tokens.

4. The method of claim 1, wherein encoding, by the video encoder, the plurality of video frames into video feature representations further comprises:
   applying self-attention along a temporal dimension and a spatial dimension to an input sequence of tokens to result in per-frame features; and
   applying a temporal fusion layer to the per-frame features along the temporal dimension to aggregate per-frame features into video features.

5. The method of claim 1, wherein the video feature representations comprise a sequence of visual embeddings including an embedding of a video start token.

6. The method of claim 1, wherein the text feature representations comprise a sequence of text embeddings including an embedding of a text start token.

7. The method of claim 1, wherein the similarity scores are computed by:
   transforming an embedding of a video start token from the video encoder into a normalized video embedding;
   transforming an embedding of a text start token from the text encoder into a normalized text embedding; and
   computing a dot product of the normalized video embedding and the normalized text embedding.

8. The method of claim 1, further comprising:
   encoding, by a multi-modal video-text encoder, the video feature representations and the text feature representations into a set of multimodal embeddings; and generating, by a classifier, an entity prediction from the set of multimodal embeddings.

9. A system of video-and-language alignment contrastive pretraining, the system comprising:
  a data interface obtaining a plurality of video frames and a plurality of text descriptions corresponding to the plurality of video frames;
  a memory storing a plurality of processor-executable instructions; and
  a processor executing the instructions to perform operations comprising:
    encoding, by a video encoder, the plurality of video frames into video feature representations;
    encoding, by a text encoder, the plurality of text descriptions into text feature representations;
    computing similarity scores between the video feature representations and the text feature representations;
    computing a first contrastive loss based at least in part on an exponential of computed similarity scores corresponding to a matching pair of a first video frame and a first text description and one or more pairs of the first video frame and text descriptions that do not match the first video frame;
    computing a second contrastive loss based at least in part on an exponential of computed similarity scores corresponding to the matching pair of the first video frame and the first text description and one or more pairs of the first text description and video frames that do not match the first text description;
    computing a video-text contrastive loss by taking a weighted sum of the first and the second contrastive losses; and
    updating the video encoder and the text encoder based at least in part on the video-text contrastive loss.

10. The system of claim 9, wherein the plurality of video frames are sparsely sampled from a video stream.

11. The system of claim 9, wherein the operations further comprise:
  partitioning each video frame into a number of non-overlapping patches;
  feeding the number of non-overlapping patches to a linear projection layer to produce a sequence of patch tokens;
  appending a video start token to the sequence of patch tokens.

12. The system of claim 9, wherein an operation of encoding, by the video encoder, the plurality of video frames into video feature representations further comprises:
  applying self-attention along a temporal dimension and a spatial dimension to an input sequence of tokens to result in per-frame features; and
  applying a temporal fusion layer to the per-frame features along the temporal dimension to aggregate per-frame features into video features.

13. The system of claim 9, wherein the video feature representations comprise a sequence of visual embeddings including an embedding of a video start token.

14. The system of claim 9, wherein the text feature representations comprise a sequence of text embeddings including an embedding of a text start token.

15. The system of claim 9, wherein the similarity scores are computed by:
  transforming an embedding of a video start token from the video encoder into a normalized video embedding;
  transforming an embedding of a text start token from the text encoder into a normalized text embedding; and
  computing a dot product of the normalized video embedding and the normalized text embedding.

16. The system of claim 9, wherein the operations further comprise:
  encoding, by a multi-modal video-text encoder, the video feature representations and the text feature representations into a set of multimodal embeddings; and
  generating, by a classifier, an entity prediction from the set of multimodal embeddings.

17. A processor-readable non-transitory storage medium storing a plurality of processor-executable instructions for video-and-language alignment contrastive pretraining, the instructions being executed by a processor to perform operations comprising:
  obtaining, via a data interface, a plurality of video frames and a plurality of text descriptions corresponding to the plurality of video frames;
  encoding, by a video encoder, the plurality of video frames into video feature representations;
  encoding, by a text encoder, the plurality of text descriptions into text feature representations;
  computing similarity scores between the video feature representations and the text feature representations;
  computing a first contrastive loss based at least in part on an exponential of computed similarity scores corresponding to a matching pair of a first video frame and a first text description and one or more pairs of the first video frame and text descriptions that do not match the first video frame;
  computing a second contrastive loss based at least in part on an exponential of computed similarity scores corresponding to the matching pair of the first video frame and the first text description and one or more pairs of the first text description and video frames that do not match the first text description;
  computing a video-text contrastive loss by taking a weighted sum of the first and the second contrastive losses; and
  updating the video encoder and the text encoder based at least in part on the video-text contrastive loss.

18. The processor-readable non-transitory storage medium of claim 17, wherein the plurality of video frames are sparsely sampled from a video stream.

19. The processor-readable non-transitory storage medium of claim 17, wherein the operations further comprise:
  partitioning each video frame into a number of non-overlapping patches;
  feeding the number of non-overlapping patches to a linear projection layer to produce a sequence of patch tokens;
  appending a video start token to the sequence of patch tokens.

20. The processor-readable non-transitory storage medium of claim 17, wherein an operation of encoding, by the video encoder, the plurality of video frames into video feature representations further comprises:
  applying self-attention along a temporal dimension and a spatial dimension to an input sequence of tokens to result in per-frame features; and
  applying a temporal fusion layer to the per-frame features along the temporal dimension to aggregate per-frame features into video features.

* * * * *